United States Patent [19]
Wissman

[11] Patent Number: 4,972,424
[45] Date of Patent: Nov. 20, 1990

[54] AUTOMATIC DITHER STABILIZATION OF A LASER CAVITY

[75] Inventor: Charles H. Wissman, Carlsbad, Calif.

[73] Assignee: Hughes Aircraft Company, Los Angeles, Calif.

[21] Appl. No.: 353,122

[22] Filed: May 17, 1989

[51] Int. Cl.$^5$ ................................................ H01S 3/13
[52] U.S. Cl. ........................................ 372/32; 372/96; 372/107
[58] Field of Search ............................ 372/32, 96, 107

[56] References Cited

U.S. PATENT DOCUMENTS

| | | | |
|---|---|---|---|
| 4,798,467 | 1/1989 | Wyeth et al. | 372/32 |
| 4,823,354 | 4/1989 | Znotins et al. | 372/32 |

Primary Examiner—William L. Sikes
Assistant Examiner—Robert E. Wise
Attorney, Agent, or Firm—Joseph E. Szabo; Terje Gudmestad; Wanda K. Denson-Low

[57] ABSTRACT

A laser cavity (12) subject to temperature induced effective length change greater than the length of a single power signature cycle of the laser is automatically stabilized by a combined digital arrangement for finding and locking on a selected signature peak corresponding to an optimum laser cavity length, and then digitally tracking such optimum length so as to stabilize operation at such peak. A piezoelectric crystal transducer (26) mounts one of the cavity mirrors (24) and is driven to change effective cavity length, first in an acquire mode, and then in a tracking mode. In acquire mode, voltage on the piezoelectric crystal transducer (26) is increased in a step wise linear fashion from near zero to a near maximum displacement of the crystal. A gain curve peak (33,34,35) is identified by sampling output power (30) of the laser, and storing the maximum value of sampled power, together with a peak transducer driving voltage at which such power maximum occurs. In a tracking mode this peak driving voltage (126,143) is combined with a digitally generated triangle dither voltage (124,142) to dither (i.e. alternate) the cavity length between upper and lower limits on either side of the gain curve peak (122) that was identified in the acquire mode.

18 Claims, 5 Drawing Sheets

AUTOMATIC DITHER STABILIZATION OF A LASER CAVITY

BACKGROUND OF THE INVENTION

1. Field of the Invention

The present invention relates to methods and apparatus for stabilization of a laser cavity, and more particularly concerns laser frequency stabilization having decreased thermal sensitivity.

2. Description of Related Art

Frequency stabilization of a laser, such as a carbon dioxide waveguide laser, for example, may be accomplished by changing laser cavity length. Use of a piezoelectric crystal transducer (PZT) that carries one of the cavity reflecting end mirrors is one arrangement for changing cavity length. The PZT transducer is driven from the output of a dither stabilizing circuit provided in a feedback loop and having as an input an optical or laser output power signal provided by a power detector. The detector is mounted with laser output optics to sample a portion of the output energy beam and provides an output power feedback signal that is fed to the stabilization circuit. The feedback stabilization circuit is effectively an analog phase comparison circuit that compares the phase of change in output power with the phase of a dither signal generated in the feedback stabilization electronics or associated circuitry to provide a control signal for the piezoelectric transducer. The latter, when energized by the output of the feedback circuit, changes effective cavity length, and therefore laser frequency, by an amount that tends to move the laser operating frequency back toward the peak of the laser gain curve, upon which stabilization is centered. One example of such a phase modulator type of frequency stabilization circuit is shown in the patent to Halmos et al, U.S. Pat. No. 4,660,206. The system of the Halmos et al patent, and other similar frequency stabilization systems, requires close control of laser temperature in order to closely control cavity length within the range of the stabilization system. Such systems can operate only over a very small temperature range, namely a magnitude that causes a cavity length change of not more than the maximum travel of the PZT. If the cavity length change is greater, the system must be manually re-adjusted before it will continue to stabilize.

Laser power signature is a graph of the cyclically repetitive variation of output power plotted against change in effective cavity length. As cavity length changes (is "scanned") through one power signature cycle, the output power varies through a plurality of peaks. Each full signature cycle, which may have several power peaks, for many lasers, occurs over a cavity length variation of a few micrometers, and, as change in cavity length continues, the power signature cycle is repeated. The repetition of the laser signature cycle derives from the fact that the laser cavity is a resonant cavity and will attain resonance at a number of different cavity lengths which are integral multiples of a half wavelength of the resonant frequency.

The commonly used device for changing effective cavity length, namely the piezoelectric crystal transducer, can provide only a limited excursion, not more than a few signature cycles. Therefore, when the piezoelectric transducer is used in frequency stabilization devices of the prior art, the laser may experience temperature changes that cause effective cavity length change of more than a few signature cycles (which may be more than the range of the transducer), thereby causing the system to lose its lock on the desired frequency.

To avoid this problem, a hybrid combination of analog and digital arrangements has been employed, which will search and lock onto a desired peak of the laser signature, and having done so, will then stabilize the frequency at such peak. This system is subject to inaccuracy, is relatively slow and exceedingly expensive. This prior system operates to ramp up the PZT driving voltage and stores the maximum laser power output obtained during such ramping up. The system then ramps the PZT voltage down until a power output of ninety percent of the previous maximum is obtained, and uses the PZT voltage of such ninety percent power output as the peak around which the analog dither stabilization is accomplished. The analog dither stabilization used may be a system such as is disclosed in the Halmos et al patent. Such a hybrid system can discriminate only between peaks that have more than ten percent difference in magnitudes, and, having re-acquired the desired peak, must then switch back to analog operation, thereby requiring a combination of digital circuits and analog circuits that are specially designed for the particular operation. These specially designed circuits, their combination and their packaging are not only more expensive, but require greater space for packaging the components.

Accordingly, it is an object of the present invention to provide for frequency stabilization of the laser that avoids or minimizes above-mentioned problems.

SUMMARY OF THE INVENTION

In carrying out principles of the present invention in accordance with a preferred embodiment thereof, frequency stabilization of laser cavity oscillations is accomplished in a tracking mode by digitally varying effective cavity length between upper and lower limits, detecting first and second magnitudes of laser output power at said upper and lower limits, respectively, determining the sense of the difference between the first and second magnitudes, and changing the effective cavity length in a sense that depends on the sense of the difference.

According to a feature of the invention, where a driving voltage is used to change a frequency controlling device, such as a PZT crystal, functional equivalent, or other frequency changing device, such driving voltage is examined to see whether or not it falls within the limits of a selected frequency device operating window, and, if it falls outside of the window, the system automatically leaves its tracking mode, enters an acquire mode and locks onto the desired peak of another signature cycle. In the acquire mode, the driving voltage is digitally varied in incremental steps, and at each step the power output is sampled and stored, together with the associated frequency controlling device driving voltage. The maximum value of sampled power is determined, together with the value of the driving voltage at which such maximum was obtained, and such driving voltage is employed as a peak component about which the dither component of the driving signal for s the frequency controlling device is varied in the tracking mode.

DESCRIPTION OF A PREFERRED EMBODIMENT

Figure 1:
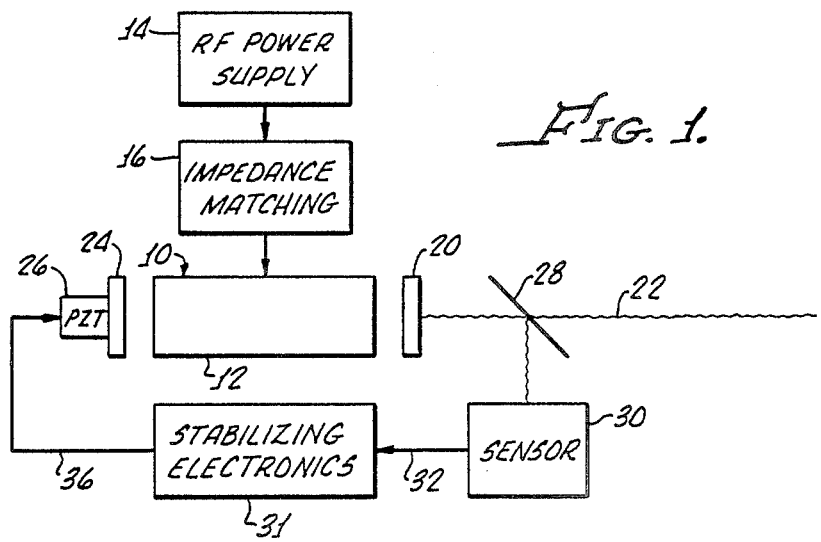
FIG. 1 is a simplified block diagram of a laser embodying frequency stabilizing electronics according to the present invention.

Illustrated in FIG. 1 is a system employing principles of the present invention for laser frequency stabilization over a relatively wide and useful range of temperatures. A carbon dioxide waveguide laser 10 includes a laser head 12 defining a laser cavity having exciting electrodes (not shown) for receiving a radio frequency (RF) exciting signal from an RF power supply 14, through an impedance matching network 16. A suitable gas mixture comprises a lasing medium that is confined within the cavity of the laser head 12 and excited by the signal provided from the RF power supply to cause laser energy oscillations within the cavity at a selected frequency. The laser cavity includes cavity end reflecting mirrors, of which the front mirror 20 provides an output coupling function, and through which is projected the desired output laser beam 22. A rear mirror 24 of the cavity is mounted on a piezoelectric crystal transducer (PZT) 26, which is arranged to move the mirror so as to adjust effective length of the cavity between the reflecting mirrors 20 and 24. The laser output beam 22 is partially reflected by a beam splitter 28 to a laser power detector 30, which provides on an output line 32 a signal that is proportional to the magnitude of detected laser output power. The detected power signal is fed to stabilizing electronics 31, which samples detected laser output power and provides on an output line 36 a driving voltage for PZT 26.

Figure 2:
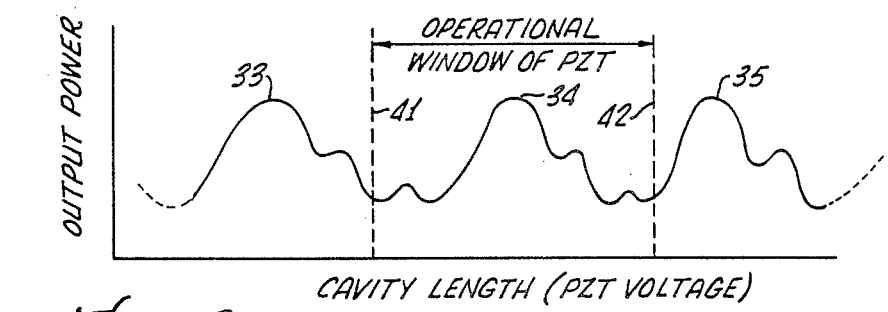
FIG. 2 illustrates an exemplary power signature of a homogeneously broadened laser.
Figure 3:
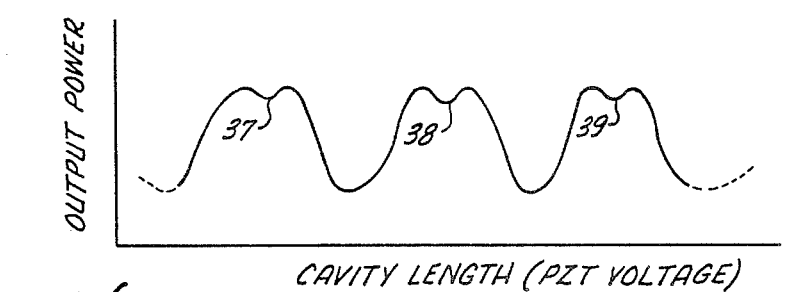
FIG. 3 shows a power signature of an inhomogeneously broadened laser.

A typical output power signature of a homogeneously broadened carbon dioxide waveguide laser is illustrated in FIG. 2. A similar power signature for an in-homogeneously broadened laser is illustrated in FIG. 3. In these figures, output power on a vertical axis is plotted against cavity length, or, in a particular mechanization, the equivalent of PZT driving voltage, on the horizontal axis. It will be seen that as cavity length changes the output power varies, and further that this variation is cyclically repetitive. In other words, for each cavity length that is an integral multiple of a half wavelength of the energy oscillations within the cavity, there is a peak, such as peaks 33, 34 and 35 of FIG. 2, and an equivalent dip in the peak, such as at points 37, 38 and 39 of FIG. 3. It is at one of these cavity lengths, corresponding to points, 33, 34, 35, 37, 38 and 39, that it is desired to operate the laser. Operation of the laser at these peak points provides maximum output power. The indicated points represent the peaks of the lase gain curves.

In general, a PZT of the type commonly used for control of laser effective cavity length has a maximum distance of travel, which is indicated by dotted lines 41 and 42 in FIG. 2, defining an effective operational window of the PZT. This window is approximately the length of a single cycle of the power signature for some PZT's chosen. In other words, the maximum change of effective cavity length that can be achieved with the PZT is the length indicated between lines 41 and 42. In many applications, a laser will experience temperature changes greater than those that would cause a cavity length change equal to the length of the operational window of the PZT.

In use of a PZT for frequency stabilization, the driving voltage of the PZT initially is adjusted so that it will provide a cavity length that is at one of the desired peaks 33, 34, and 35. The dither stabilization circuit essentially attempts to hold effective cavity length to a selected local maximum of laser power. However, in most lasers, there are maxima that do not correspond to the optimum laser cavity length. That is, in a single output power signature cycle there may be a primary power maximum and several smaller power maxima. Thus an operator must first manually adjust the cavity length to select the proper maximum before engaging the circuit. However, as previously stated, the various transducer devices, such as PZT's, have a limited travel range, and therefore can correct for only a limited amount of cavity length change. If, after an operator adjusts the cavity length and engages the circuit, the laser temperature changes appreciably, the PZT may run out of travel, and an operator will have to manually adjust the PZT to another gain peak. Obviously such constant operator involvement is unacceptable in many laser systems.

Circuits have been built which are a combination of the above-described analog circuit and a digital circuit to handle search for a proper local maximum or minimum, but the interface between the two has proven to be difficult and expensive.

Applicant has provided a digital system, operable under control of a single integral micro-controller, that will automatically acquire a selected peak of the output power signature, and upon acquisition of such peak, accomplish an unique digital dither stabilization employing the same controller. Because applicant's digital stabilization circuit is built around a micro-controller, circuit parameters can be quickly and easily changed with simple software modifications. Examples of such parameters would be dither frequency, dither amplitude, dither waveform, tracking speed, etc. To change such parameters in an analog stabilization circuit would require component changes or circuit re-design. Because the digital circuit only samples the laser power when the PZT voltage is at the dither extremes, as will be described below, it is sampling during periods of the highest signal to noise ratio. This is in contrast to the analog circuit which integrates throughout the dither waveform. Thus, the digital circuit is less sensitive to noise.

In general, according to applicant's method, the system operates initially in a low gain acquire mode in which a full signature cycle is scanned to find and lock on the desired peak, which may be a maximum power peak of a signature cycle. Having found the desired peak, the PZT driving voltage is provided with a peak component that corresponds to the desired power peak operating point. Then, in a tracking mode that uses high gain amplification of detected output power, the cavity length is dithered by combining with the PZT peak component a component that is digitally varied between low and high dither values. Power is sampled when the dither component of the PZT voltage is at its low and high values. If the power sample taken when the dither component is at its high value is greater than the power sample taken when the dither component is at its low value, the PZT peak component is increased. If the power sample taken when the dither component is at its high value is less than the power sample taken when the dither component is at its low value, the PZT peak component is decreased. If both samples are the same, the peak component is left unchanged. Should the total PZT voltage go beyond the operational window of the PZT during any cycle of the dither signal, the system automatically shifts back to the acquire mode and finds and locks onto another peak.

Figure 4:
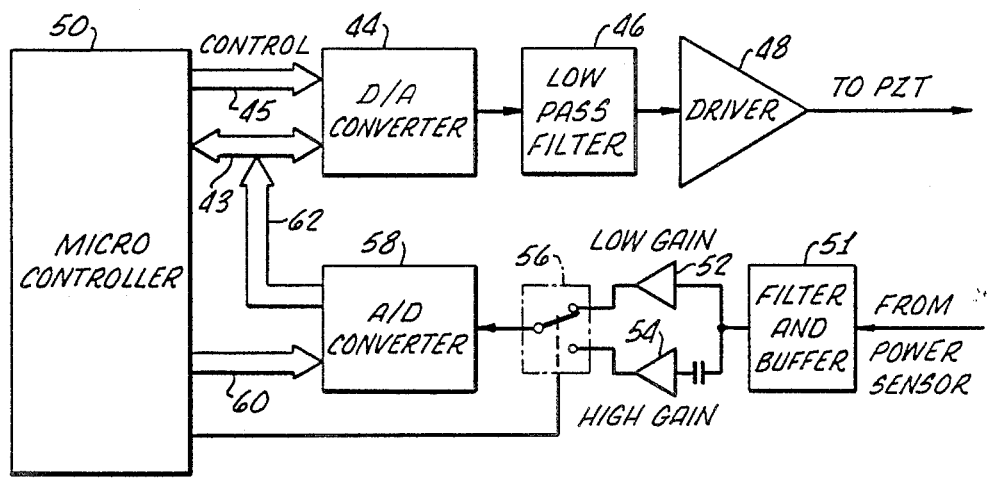
FIG. 4 is a block diagram of a digitally controlled system embodying principles of the present invention.

FIG. 4 is a block diagram of a digital stabilization system (stabilizing electronics 31 of FIG. 1) embodying principles of the present invention. The system is controlled by a digital program that is contained in a microcontroller 50, such as the 8751 Micro-Controller of Intel Corporation. PZT driving signals are generated under control of the micro-controller, which feeds digital signals via a data bus 43 to a digital to analog converter 44, controlled by signals received from the microcontroller via a bus 45. Converter 44 produces an analog signal fed through a low pass filter 46 to a PZT driver 48, the output of which is fed as a driving voltage to the PZT 26 of FIG. 1. The signal from the power detector 30 of FIG. 1 is fed through a filter and buffer 51, and thence in parallel to a low gain amplifier 52 and an AC coupled high gain amplifier 54, the outputs of which are alternatively fed via a gain switch 56 to an analog to digital converter 58, which is controlled from the micro-controller by signals received via a control bus 60. The output of the analog digital converter 58 is fed via data buses 62 and 43 into the micro-controller 50.

ACQUIRE MODE

As previously mentioned, the program stored in the controller automatically operates initially in an acquire mode to find and lock onto a selected peak, and then in a tracking mode in which the selected peak is tracked. In tracking mode, the PZT voltage is monitored at each dither cycle to determine when the PZT operational window is exceeded, and if the PZT driving voltage departs from its window the system automatically returns to the acquire mode in which it locks onto the selected peak of another cycle of the output power signature. Thus, without any operator adjustment, the system automatically continues to operate, stabilized to the desired power peak, even in the presence of temperature variations large enough to change the cavity length by amounts greater than a single signature cycle and greater than the maximum travel of which the PZT is capable.

Figure 5:
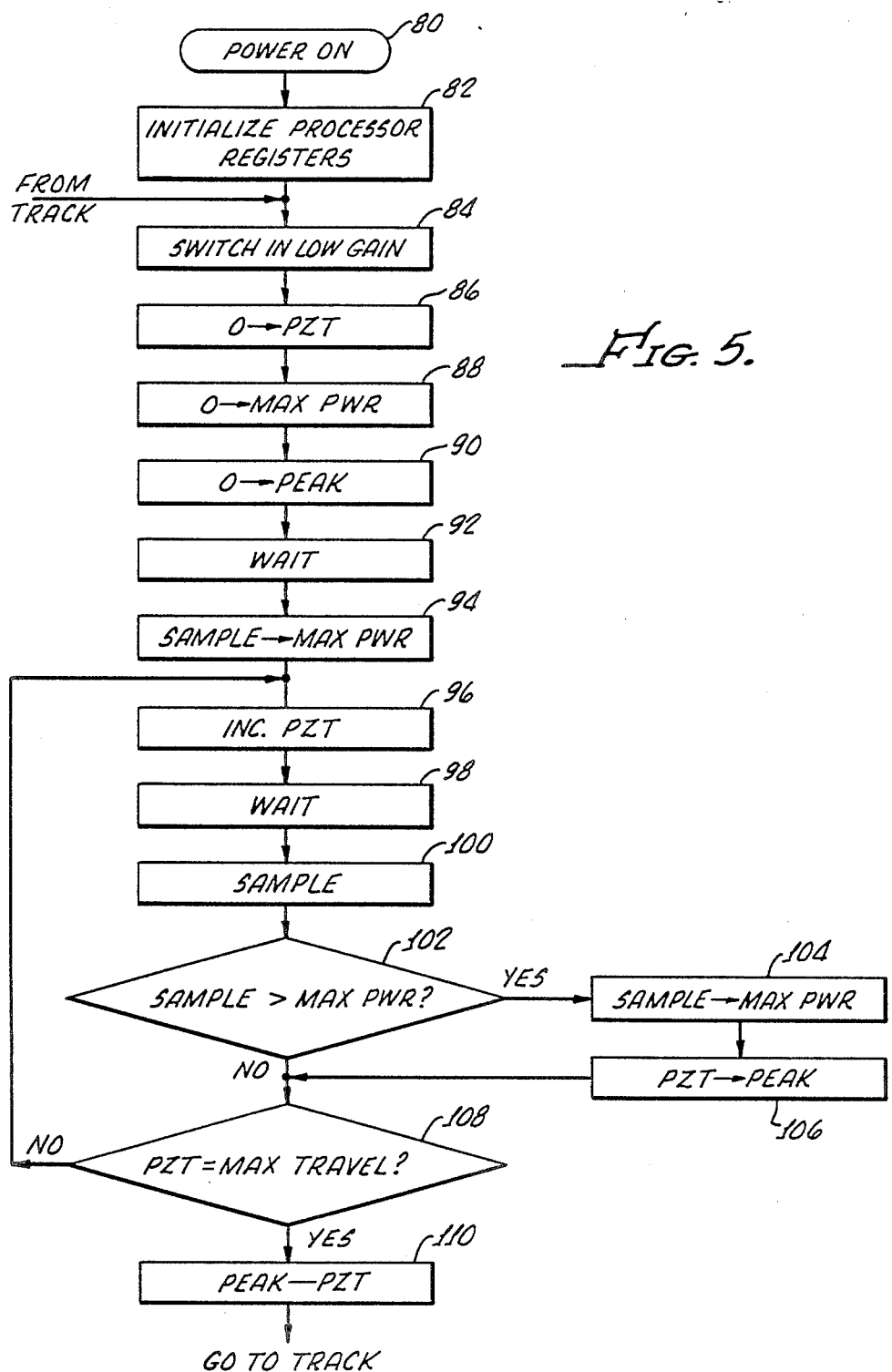
FIG. 5 is a flow chart that sets forth an acquire mode of the system of FIG. 4.

A flow chart of the acquire mode of the digital program stored in controller 50 is shown in FIG. 5. With the power on, block 80, the processor registers (memory locations) are initialized, block 82, and the gain switches operated to put the system in the low gain position, block 84. Low gain is employed in the acquire mode because a greater range of PZT driving and sensed power variation will occur. Memory locations for storing maximum sensed power (MAX PWR) and the PZT peak component (PEAK) are contained in the processor. The memory locations for storing the PZT driving voltage is provided by a latch within the D/A converter 44 (FIG. 4). It is this voltage in the D/A converter that controls the analog out of the converter which is fed to the PZT. Memory locations for storing the PZT driving voltage (PZT), for storing maximum sensed power (MAX PWR) and for storing a PZT peak component (PEAK), are then each zeroed, as indicated in blocks 86, 88 and 90, respectively. A waiting period of about 75 milliseconds, block 92, then occurs to allow the circuit and the PZT to settle down. Now, as indicated in block 94, the laser output power is sampled, and the sample stored in the memory location designated maximum power (MAX PWR).

A ramp loop is then begun in which, for each iteration, PZT voltage is incremented, power is sampled, power maximum is stored, and maximum PZT travel is examined. The ramp loop is initiated, as indicated in block 96, by incrementing the PZT voltage by one step. That is, the driving voltage of the PZT (stored in the D/A converter) is changed from zero to the first voltage step. In a full ramp, which will drive the PZT through substantially its full range of travel and through at least one full output power signature cycle, there may be approximately 1024 steps in one particular mechanization of the present invention, employing a 12 bit digital to analog converter. Again there is a waiting period which may be about one millisecond, as indicated in block 98, at the end of which the output power is again sampled, in block 100, by sampling the output of the A/D converter 58. This sample is compared, block 102, to the value stored in the maximum power location in the step indicated in block 94. If the sampled power is greater than the previously stored maximum power, the new value of the sample is transferred into the maximum power storage location, as indicated in block 104. In addition, the voltage of the PZT at which this last sample occurred is shifted into the memory location indicated as "PEAK", as indicated in block 106. The location PEAK stores the driving voltage of the PZT that corresponds to the power value stored in the location MAX PWR.

If the comparison of block 102 indicates that the sample is not greater than the maximum power, the value in this memory location remains unchanged, and the total magnitude of the PZT driving voltage is compared to a predetermined maximum value to determine whether or not the PZT has exceeded its window, as indicated in block 108. If the PZT has not exceeded its maximum travel, the ramp loop returns to block 96, wherein the PZT driving voltage is incremented through a second step, and the loop repeats. For each repetition of the ramp loop any increase in maximum power is stored, together with storage of the corresponding PZT driving voltage, so that at the completion of the selected number of loop repetitions the maximum power memory location (MAX PWR) contains the value of the maximum power observed during the cavity length scan, and the peak memory location (PEAK) contains the value of the PZT driving voltage at which such maximum power was obtained. When the PZT driving voltage equals its maximum travel, the voltage stored in the PEAK location is then transferred to the PZT storage location (PZT) of the converter, as in block 110, and the system goes into its tracking mode. This PZT voltage stored in the converter latch, as indicated in block 110, is the PZT driving peak component that causes the PZT to adjust effective cavity length to the desired peak of the gain curve. It is used initially as the driving voltage peak component in the tracking mode, and may be modified in the tracking mode as effective cavity length changes are tracked

TRACKING MODE

In the tracking mode the PZT voltage peak component obtained in the acquire mode is combined with a digital dither component, so that the cavity length is dithered around the selected power peak and the PZT voltage is dithered around the peak component.

Figure 6:
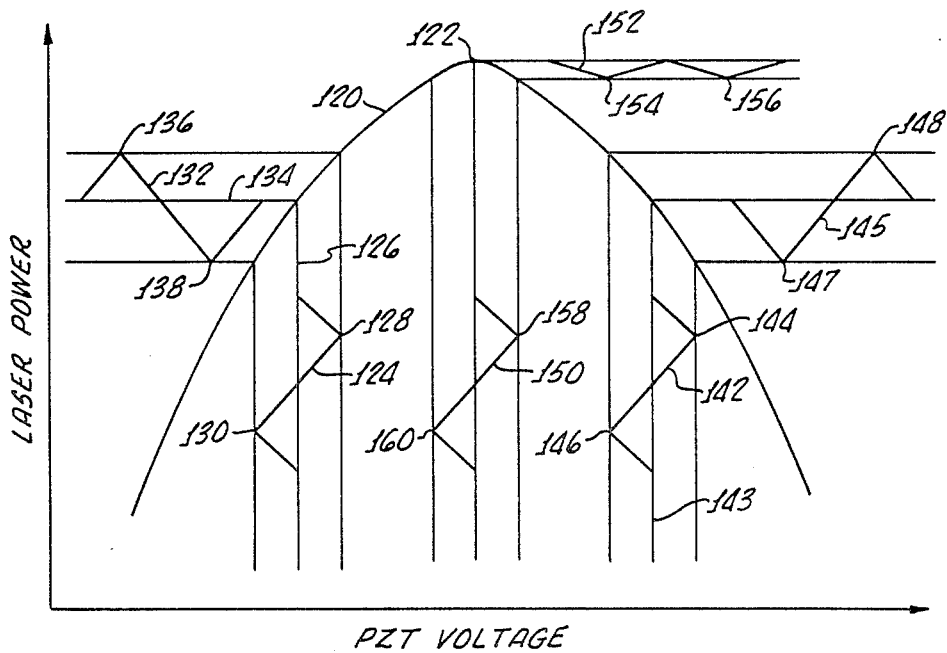
FIG. 6 illustrates an exemplary laser gain curve and some relations of dither signal and output power.

A unique digital dithering arrangement is employed in which output power is sampled only at high and low points of the dither, and these two samples per dither cycle are compared to determine which way or whether to change the PZT peak component. The digital dither arrangement is explained in connection with the illustration of FIG. 6, wherein curve 120 represents a laser gain curve having a desired peak 122 at which it is desired to operate the laser. Curve 124 illustrates an exemplary triangular dither waveform component of the PZT driving signal, with the laser operating to the left of peak 122. A triangular waveform is preferred for the dither because it provides a less sudden change in laser frequency (e.g. small fluctuating frequency change caused by the dither waveform). This dither signal is illustrated in the drawing as varying above (toward the right as viewed in FIG. 6) and below (toward the left) a peak component indicated at vertical line 126, between a dither high point at 128, and a dither low point at 130, with the dither repeating the indicated cycle. With such a triangular dither signal, the laser output power varies in a corresponding fashion, as indicated by curve 132, about a midpoint indicated at 134, which corresponds to the midpoint (peak component) 126 of the dither. The output power varies between a maximum indicated at 136, corresponding to the maximum dither 128, and a minimum 138, corresponding to the minimum dither 130.

With the laser operating to the right of the peak of the gain curve, a dither signal may be represented as curve 142, which varies about a peak component 143 between a dither high peak 144 and a dither low peak 146. The dither curve 142 results in a component of laser output power variation indicated by curve 145. In this situation the output power variation has a low point 147 corresponding to dither high peak 144 and a high point 148 corresponding to dither low point 146. Similarly, when the laser is operating precisely at the peak of the gain curve 120, the dither component may be represented by curve 150 to provide a resulting dither related power variation 152 which has peaks 154 and 156 corresponding to the dither high and low peaks 158 and 160, respectively. In this case, however, the output power component peaks are equal.

When the laser is operating to the left of the peak of the gain curve, the output power at point 136 when the dither is at its high value (point 128), is greater than the output power at point 138, when the dither is at its low value (point 130). Conversely, with the laser operating to the right of the peak of the gain curve, the sampled output power point 147 when the dither is at its high value (point 144) is less than the sampled output power point 148 when the dither is at its low value (point 146). By sampling output power only at the dither high and low points, the differences between sampled powers are more pronounced and more readily discriminated to give greater precision, accuracy and simplicity to the detection circuitry.

If the comparison of output power samples at dither high and low values shows the laser to be operating to the left of the gain curve peak, the peak component of the PZT signal is increased, preferably by a relatively small amount, such as three steps, where the full PZT travel is accomplished in about 1024 steps for a 12 bit digital to analog converter. This moves the operating point closer to the peak, and such detection and further shifting of the peak component of the PZT driving voltage is accomplished on the next and succeeding dither cycles until operation at the gain curve peak is obtained. As previously mentioned, this is indicated by substantial equality between the sampled output power peaks for the high and low values of the dither.

Of course with the laser operating on the other side, to the right of the gain curve peak, the comparison of sampled output power will show that the output power is higher at the low peak of the dither than it is at the high peak of the dither, and thus the peak component of the PZT driving voltage is diminished by a few steps for each dither cycle until the peak of the gain curve is attained.

TRACKING FLOW CHART

Figure 7:
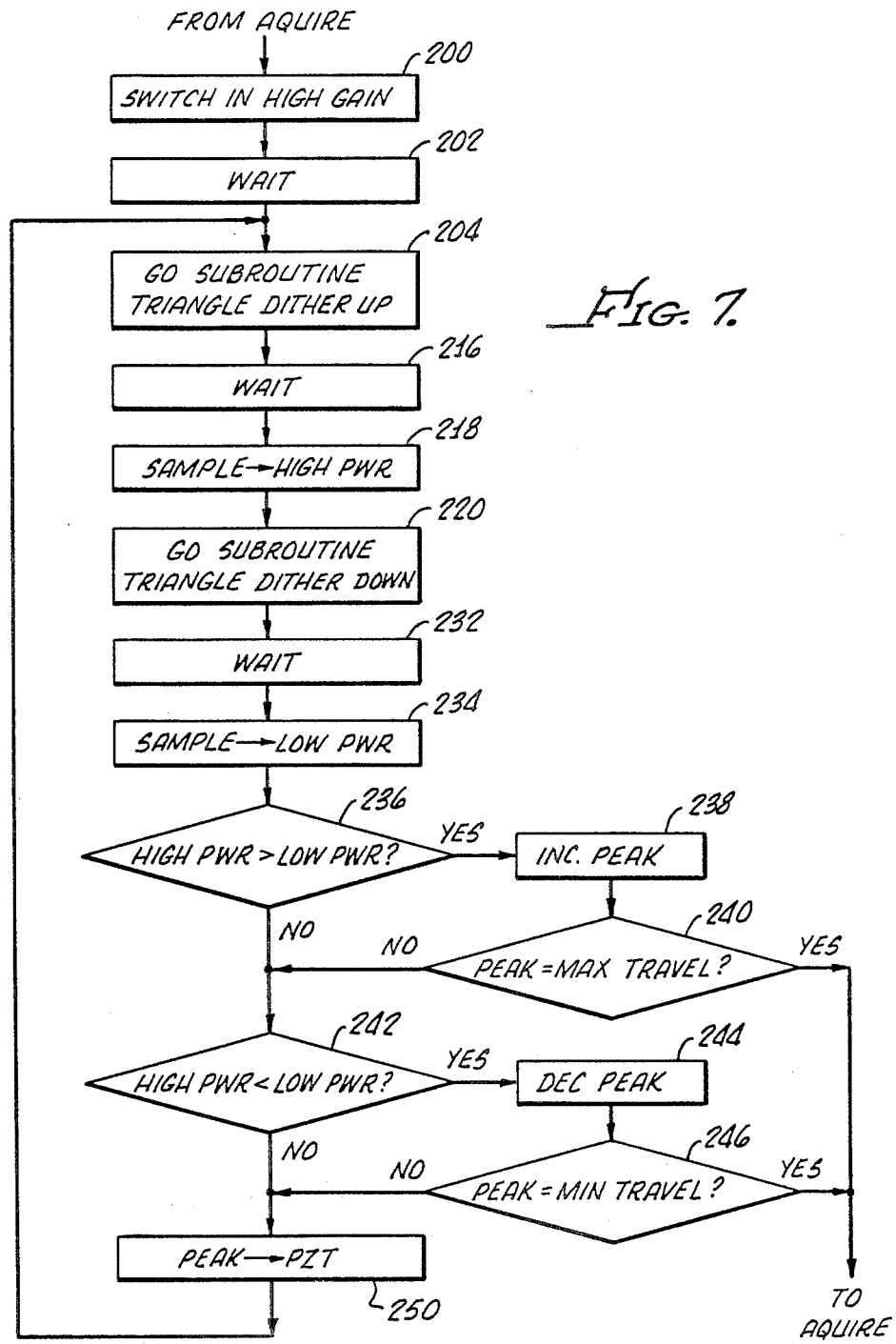
FIGS. 7, 8 and 9 are flow charts that set forth a digital dither tracking mode for the system of FIG. 4.
Figure 8:
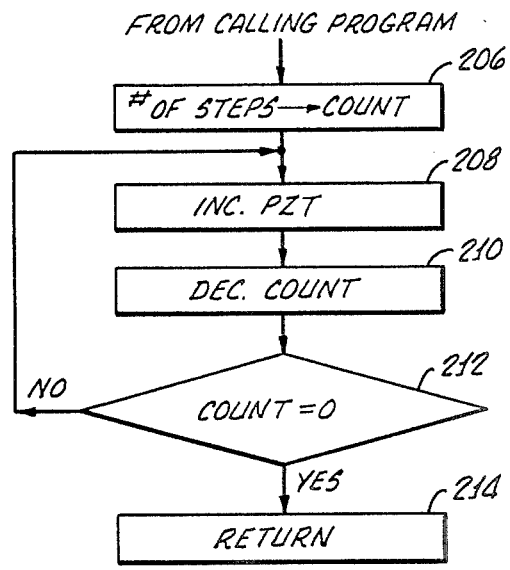
Figure 9:
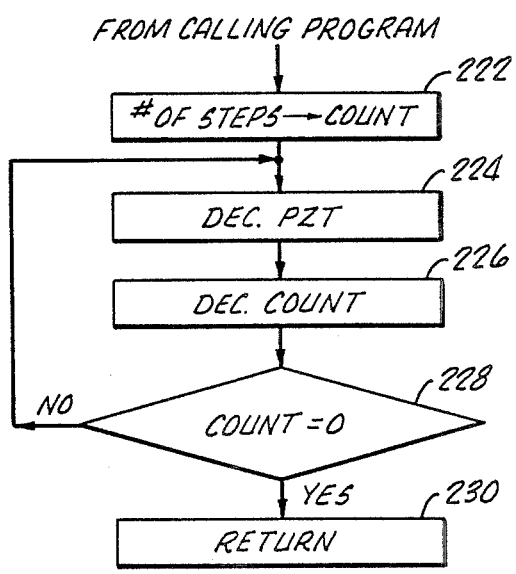

Illustrated in FIGS. 7, 8 and 9 are flow charts of the program contained in the micro-controller 50 that generates a triangular dither waveform component that is combined with the peak component of the PZT driving signal for tracking a selected power peak. When it has been determined in the acquire mode that the PZT has reached its maximum travel and the peak of the PZT voltage (corresponding to the voltage at which the maximum power was observed during the acquire mode) has been stored, the system automatically goes into the tracking mode, first actuating the gain switch 64 to switch from low gain to high gain. AC coupled high gain is employed in the tracking operation because smaller changes of sensed output power are experienced, and the increased gain allows greater precision and more accurate discrimination between power levels. The switch to high gain is indicated in block 200.

After switching to high gain, a waiting period occurs, as indicated in block 202. The program then calls a triangle dither up sub-routine, block 204. This subroutine is illustrated in FIG. 8 and includes as its first step setting into a counter a number of steps through which the dither signal component is to be incremented, as indicated in block 206. The value (e.g. the peak component) in the PZT memory location (e.g. the D/A converter) is then incremented by a single step, as in block 208, and the count is decremented, block 210. If the count is not at its maximum value (the high point of the dither component), as in block 212, the dither up sub-routine loop returns to again increment the PZT by a single step and decrement the counter. If the counter is zero, the sub-routine returns to the main program, block 214, and the system waits as indicated in block 216. After the wait, power is sampled (now at the high point of the dither component) and the sample is stored in the high power (HIGH PWR) memory location 218, whereupon the program calls for a triangle dither down sub-routine, as in block 220. The triangle dither down sub-routine is illustrated in FIG. 9, and is substantially similar to the triangle up sub-routine, starting, as in block 222, by setting into a counter a number of steps through which the dither component is to be decremented. The number in the PZT memory location is then decremented, block 224, and the counter is decremented, block 226. This is repeated if the count is not yet zero, as in block 228, but if the count is zero, the sub-routine returns control to the main program, block 230.

Upon return of control to the main program, the system waits, as indicated in block 232, to allow the components and signals to settle. The output power is then sampled, and the sample stored in the low power memory location, as indicated in block 234. This is the sample taken at the low point of the dither signal.

Having completed one dither cycle and sampled output power at both high and low points of the dither, HIGH PWR and LOW PWR values (power existing at high dither and low dither respectively) are compared as indicated in block 236. If HIGH PWR is greater, the system is operating to the left of the gain curve peak, the peak component is incremented, block 238, and the PZT driving voltage (PEAK) examined to determine if it has reached its maximum, block 240. If the PZT has reached its maximum travel, stabilization at this particular peak is no longer possible, and the system returns to the acquire mode. If HIGH PWR is less than LOW PWR, block 242, it is known that the system is operating to the right of peak of the laser gain curve, and the peak component of the PZT driving voltage is decremented, as indicated in block 244. Again, the value of PEAK is examined to determine whether or not a minimum PZT travel has occurred, block 246, and, if so, the system returns to the acquire mode. If neither maximum nor minimum travel has occurred, as indicated by the examinations which occurred in blocks 240 and 246, the incremented or decremented peak value is stored in the PZT memory location, block 250, and the next cycle of the triangle dither waveform is initiated by return of the program to block 204.

Although the change in effective cavity length has been illustrated as being carried out by a piezoelectric crystal transducer carrying a cavity end mirror, it will be readily understood that other devices for changing the effective cavity length may be employed. Such devices include those that are used either internally or externally of the laser cavity, such as, for example, an internal electro-optic modulator. Laser frequency control (e.g. change of effective cavity length) by variation of power of an RF power source that excites the laser electrodes has been suggested, and such variation of the RF exciting signal can be employed in the place of the piezoelectric crystal variation.

In an RF excited laser, a reflection or RF return of the RF exciting signal is caused by mismatch of impedances of the laser cavity on the one hand and the RF power source on the other. Under certain conditions this RF return has a signature that closely corresponds to the laser power signature. Therefore, such RF return may be substituted for the detected output power and applied as the input to the described stabilization electronics.

Although methods and apparatus have been described as applied to a homogeneously broadened laser system, it will be apparent that, with relatively small modification of the described programs, the methods and apparatus will be readily applicable to in-homogeneously broadened laser systems.

Operation of the described method and system for a homogeneously broadened laser system is based upon selecting and operating at a peak of the laser gain curve, whereas, for an in-homogeneously broadened system operation is based upon the dip at the top of the gain curve, as illustrated in FIG. 3. Therefore, it will be understood that the terms "maximum" and "peak" used throughout the description and claims hereof in reference to laser power signatures include the dip at the top of the gain curve of the in-homogeneously broadened system as well as the peak of the gain curve of the homogeneously broadened systems.

There have been disclosed methods and apparatus for digitally dither stabilizing effective cavity length of a laser in which the optimum cavity length is automatically found and maintained, even though the laser temperature may vary over large extremes. These results are accomplished by a simple, compact and inexpensive apparatus.

What is claimed is:

1. In a laser having a laser cavity containing a lasing medium that is excited to generate energy oscillations of a selected frequency in the cavity and to provide an output beam from the cavity, said beam having a power that varies with effective length of said cavity, said laser including a frequency control device for varying effective length of the cavity, to thereby vary frequency of said oscillations, a method for stabilizing frequency of the oscillations comprising:

varying effective cavity length between first and second values, detecting magnitudes of power of said output beam at said first and second values, respectively, and changing effective length of said cavity in a sense determined by whether the magnitude of power at said first value is greater than or less than the magnitude of power at said second value.

2. The method of claim 1 wherein said step of varying effective cavity length comprises the steps of digitally generating a driving signal dither component that varies between upper and lower dither peaks, applying said driving signal dither component to said control device, said step of detecting magnitudes of said power comprising detecting magnitude of the power when said driving signal component is at said upper dither peak and detecting magnitude of said power when said driving signal component is at said lower dither peak.

3. The method of claim 2 wherein the step of changing effective length in accordance with the sense of the difference comprises the step of increasing said driving signal component if the magnitude of said power at said lower dither peak is less than magnitude of said power at said upper dither peak and decreasing said driving signal component if magnitude of said power at said lower dither peak is greater than magnitude of said power at said upper dither peak.

4. The method of claim 1 wherein said step of varying effective cavity length between first and second values comprises digitally generating an effectively triangular waveform driving voltage that varies between lower and higher dither peaks, including the step of applying said driving voltage to said control device, and wherein said step of changing the effective cavity length comprises increasing said driving voltage if magnitude of output power detected at said lower peak is less than magnitude of power detected at said higher peak, and decreasing said driving voltage if magnitude of power detected at said lower peak is greater than magnitude of power detected at said higher peak.

5. The method of claim 1 wherein said laser includes an end reflector, and wherein said control device comprises a piezoelectric crystal mounting said end mirror.

6. The method of claim 1 including the step of detecting magnitude of change of effective cavity length, and, if said change of cavity length departs from a predetermined range,
  (a) automatically operating said control device to cause effective cavity length to scan through a predetermined amount, and
  (b) automatically adjusting the effective cavity length to a length at which said power of scream has a preselected maximum.

7. The method of claim 1 including the step of determining if said effective cavity length change departs from a predetermined range, and, if so, automatically acquiring a new output power peak, said step of acquiring a new output power peak comprising the steps of
  (a) operating said control device to cause a substantially regularly increasing change in effective cavity length by a predetermined amount,
  (b) repetitively measuring power of said output beam as said effective cavity length changes,
  (c) selecting an amount of said effective cavity length change at which a maximum value of said measured power occurs, and
  (d) varying effective cavity length between upper and lower limits on either side of the length at which said maximum value occurs.

8. The method of claim 2 including the step of determining if said effective cavity length change departs from a predetermined range, and, if so, acquiring a new output power peak, said step of acquiring a new output power peak comprising the steps of
  (a) generating a driving ramp signal and applying it to said control device to cause a regularly increasing change in effective cavity length to a predetermined amount of change,
  (b) repetitively measuring power of said output beam as said effective cavity length changes,
  (c) storing magnitude of said ramp signal at each such power measurement,
  (d) selecting a magnitude of said ramp signal at which a maximum power value of said measured power occurs to select a driving signal peak component,
  (e) combining said driving signal peak component with said dither component, and
  (f) applying said combined signal to said control device to vary effective cavity length between upper and lower limits on either side of the length at which said maximum power value occurs.

9. For use with a laser in which a lasing medium contained in a laser cavity is excited to generate energy oscillations within the cavity between cavity end reflectors and to provide an output beam from the cavity through a first one of said reflectors, si beam having a power that varies with change in effective length of said cavity, and wherein said laser includes a control device that varies the effective length of said cavity in accordance with a driving signal applied thereto, a method for stabilizing frequency of said energy oscillations comprising:
  generating a driving signal dither component that varies between low and high dither values, and generating a driving peak signal component,
  combining said components to provide a combined driving signal to said control device,
  adjusting the value of said peak component to provide an effective cavity length that causes power of said output beam to have a selected maximum,
  sampling power of said output beam when said dither component is at said low and high dither values,
  determining the sense of the difference between the sampled power at said low and high dither values, and
  changing said peak component in a sense determined by whether the sampled power at said low dither value is greater than or smaller than it is at said higher dither value.

10. The method of claim 9 wherein said step of changing the peak component comprises increasing the peak component if the power sampled at said low dither value is less than the power sampled at said high dither value, and decreasing the component if the magnitude of the power sampled at said low dither value is greater than the magnitude of the power sampled at said high dither value.

11. The method of claim 9 including the step of acquiring a new power peak if said peak component is not within a predetermined range of values of peak components, said step of acquiring comprising the steps of setting said peak component to a first limit value, changing said peak component from said first limit value to a second limit value, repetitively sampling output power of the laser as said peak component is changed, determining a maximum power from said output power samples, and employing the value of the peak component that corresponds to said sampled output power maximum as the peak component to be combined with said dither component to provide a combined driving signal, said peak component in said acquire step being applied to said control device without being combined with said dither component.

12. In a laser having a laser cavity containing a lasing medium that is excited to generate energy oscillations of a selected frequency in the cavity, and in which an output energy beam having a beam power is projected from the cavity, apparatus for stabilizing the laser cavity comprising:
  dither means for varying effective cavity length between first and second values,
  means for detecting first and second magnitudes of the output energy beam power at said first and second values respectively,
  means for determining the sense of the difference between said first and second magnitudes, and
  peak means responsive to the sense of said difference for changing the effective cavity length in a sense determined by whether the magnitude of power at said first value is greater than or less than the magnitude of power at said second value.

13. The apparatus of claim 12 wherein said dither means for varying effective cavity length comprises an effective cavity length changing device, means for digitally generating a driving signal that varies between first and second values, means for applying said driving signal to said device, said peak means comprising means responsive to the sense of the difference between said first and second magnitudes for increasing said driving signal when one of said magnitudes is greater than the other and for decreasing said driving signal when said one magnitude is smaller than the other.

14. The apparatus of claim 12 wherein said means for varying effective cavity length comprises an effective cavity length changing device, means for digitally generating a substantially triangular form driving voltage dither component that varies about a peak component between minimum and maximum values, means for applying said driving voltage to said control device, said means for detecting magnitude of said output power comprising means for detecting said first magnitude when said driving voltage dither component is at said minimum peak, and means for detecting said second magnitude when said driving voltage dither component is at said maximum peak, said peak means comprising means for increasing said driving voltage peak component by an incremental steady amount when the difference between said first and second magnitudes has a first sense and for decreasing said driving voltage peak component by an incremental steady amount when said difference has an opposite sense.

15. The apparatus of claim 14 including means for detecting magnitude of effective cavity length and means responsive to a detected effective cavity length that is outside of a predetermined range for generating a scanning ramp driving signal and applying said ramp driving signal to said control device, means for repetitively sensing magnitude of output power as said ramp driving signal changes, means for storing the magnitude of said ramp driving signal as said peak component when the output power sensed during said ramp driving signal is at a maximum, and means for combining said peak component with said dither component as a combined driving signal applied to said device.

16. The apparatus of claim 12 wherein said laser has an output power signature that cyclically repeats with change of effective cavity length, and including acquire means responsive to an effective cavity length outside of a predetermined range for generating a driving voltage peak component corresponding to a predetermined maximum output power, said acquire means comprising means for generating a driving voltage ramp component that varies between a minimum value and a maximum value over a range sufficient to cause an effective cavity length change that is substantially equal to one output power signature cycle of said laser, means for repetitively sampling said output power at a number of different values of said driving voltage ramp component and storing the value of the ramp component corresponding to the output power sample, means for determining the maximum output power sample and the peak value of the ramp component that corresponds thereto, said driving voltage peak component comprising said peak value of the ramp component, said dither means comprising an effective cavity length changing device, and means for generating a driving voltage dither component, means for combining said peak component with said dither component and applying said combined components to said device, whereby effective length of the laser cavity is dithered about a power peak of said output signature, and whereby a new power peak of said output power signature is automatically acquired when said effective cavity length is outside of a predetermined range.

17. The apparatus of claim 16 wherein said acquire means comprises means for detecting total effective cavity length change repetitively while said dither component is applied to said device, and for initiating said driving voltage ramp component if the detected change of effective cavity length departs from a predetermined range.

18. For use in a laser having a laser cavity containing a lasing medium that is excited to generate energy oscillations of a selected frequency in the cavity and to provide an output power beam defining an output power signature having a plurality of signature cycles, said laser including a frequency control device for varying effective length of the cavity to thereby vary frequency of said oscillations, said laser being subject to temperature variation that changes effective cavity length by an amount greater than one output power signature cycle of the laser, a digital method for automatically searching for and locking on a selected peak of said output power signature and stabilizing the laser at said selected peak of one or another of said output power signature cycles, said method comprising:

(a) generating a ramp signal,
(b) applying said ramp signal to said control device so as to vary effective length of the cavity,
(c) repetitively incrementing said ramp signal,
(d) sampling the output power of the laser at each increment of said ramp signal,
(e) storing the value of said ramp signal at each power sample,
(f) determining the maximum value of said power samples and the corresponding maximum of said ramp signal and storing said maximum value of power samples as a peak component,
(g) digitally generating a driving signal dither component,
(h) varying said driving signal dither component between lower and upper values,
(i) combining said dither component with said peak component of step (f) and applying said combined components to said control device for dithering effective length of said cavity,
(j) sampling said laser output power when said dither component is at said upper and lower values respectively,
(k) incrementing said peak component if the power sampled when said driving signal dither component is at a high value is greater than the power sampled when said driving signal dither component is at a low value,
(l) decrementing said peak component if the power sampled when said driving signal dither component is at a high value is less than the power sampled when said driving signal dither component is at a low value,
(m) comparing the peak component to a predetermined magnitude, and
(n) acquiring a new power peak if said comparison indicates the peak component to be outside of a selected range, said step of acquiring a new power peak comprising repeating steps (a) through (f) inclusive.

* * * * *